(12) United States Patent
Oh (10) Patent No.: US 11,480,499 B2
(45) Date of Patent: Oct. 25, 2022

(54) SENSOR TUBE STRUCTURE THAT SUPRESSES CARBON DEPOSITION

(71) Applicants: HYUNDAI MOTOR COMPANY, Seoul (KR); KIA MOTORS CORPORATION, Seoul (KR)

(72) Inventor: Sungjong Oh, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 76 days.

(21) Appl. No.: 17/078,996

(22) Filed: Oct. 23, 2020

(65) Prior Publication Data

US 2021/0164865 A1 Jun. 3, 2021

(30) Foreign Application Priority Data

Dec. 2, 2019 (KR) .......................... 10-2019-0158366
Mar. 24, 2020 (KR) .......................... 10-2020-0035589

(51) Int. Cl.
*G01M 15/10* (2006.01)
*F01N 13/00* (2010.01)
*G01M 15/02* (2006.01)

(52) U.S. Cl.
CPC ......... *G01M 15/104* (2013.01); *F01N 13/008* (2013.01); *G01M 15/02* (2013.01)

(58) Field of Classification Search
CPC .... F01N 13/008; G01M 15/02; G01M 15/104
See application file for complete search history.

(56) References Cited

U.S. PATENT DOCUMENTS

| | | | | |
|---|---|---|---|---|
| 3,963,005 | A | * | 6/1976 | Eckert ................. F02M 69/386 261/50.2 |
| 4,903,648 | A | * | 2/1990 | Lassankse ........... F02D 41/1439 123/703 |
| 2002/0000377 | A1 | * | 1/2002 | Matsuda ............ G01N 27/4071 204/426 |
| 2018/0321125 | A1 | * | 11/2018 | Holzknecht ........ G01N 27/4077 |
| 2021/0323413 | A1 | * | 10/2021 | Kang .................. B60L 15/2009 |

* cited by examiner

*Primary Examiner* — Eric S. McCall
(74) *Attorney, Agent, or Firm* — Lempia Summerfield Katz LLC (57) ABSTRACT

A sensor tube structure includes a sensor housing, a sensor mounted on the sensor housing, an external tube mounted at an end of the sensor housing to enclose the sensor, an inner tube provided to be movable inside the external tube, a drive plate in which a sensor hole into which the sensor is inserted is formed, and is coupled to the inner tube, and an actuator mounted on the sensor housing and selectively moving the drive plate.

17 Claims, 6 Drawing Sheets

SENSOR TUBE STRUCTURE THAT SUPRESSES CARBON DEPOSITION

CROSS-REFERENCE TO RELATED APPLICATIONS

This application claims priority to and the benefit of Korean Patent Application No. 10-2020-0035589, filed on Mar. 24, 2020, and Korean Patent Application No. 10-2019-0158366, filed on Dec. 2, 2019, the entire contents of which are incorporated herein by reference.

FIELD

The present disclosure relates to a sensor tube structure. More particularly, the present disclosure relates to a sensor tube structure that suppresses carbon deposition.

BACKGROUND

The statements in this section merely provide background information related to the present disclosure and may not constitute prior art.

An oxygen sensor or a lambda sensor is a device that measures partial pressure of oxygen $O_2$ in a gas or liquid. The oxygen sensor is used to adjust fuel and oxygen ratio required by an internal combustion engine. The oxygen sensor measures the amount of oxygen contained in the exhaust gas and feeds it back to an electronic control unit (ECU), and the ECU achieves the maximum combust efficiency of the internal combustion engine by adjusting the target air/fuel ratio by adding or subtracting the amount of fuel and air.

The oxygen sensor uses a zirconia or titania element to measure the oxygen concentration and the element is positioned in the tube structure. As some of the exhaust gas passes through the tube structure, the oxygen concentration is measured through the device.

As exhaust gas recirculation (EGR) is used, carbon is generated in exhaust gas, and carbon is deposited on the outside and inside of the oxygen sensor tube. In the condition of low exhaust flow rate, mainly carbon is deposited by sticking to the outside and inside of the sensor tube. The deposited carbon blocks the hole through which exhaust gas passes, reducing the amount of exhaust gas flowing into the sensor, causing the sensor's responsiveness to be deteriorated. When oxygen sensor responsiveness is deteriorated, the combustion efficiency of the internal combustion engine may be deteriorated.

The above information disclosed in this Background section is only for enhancement of understanding of the background of the present disclosure, and therefore it may contain information that does not form the prior art that is already known to a person of ordinary skill in the art.

SUMMARY

The present disclosure provides a sensor tube structure capable of suppressing carbon deposition and removing deposited carbon through a structure in which the oxygen sensor tube can physically move according to the exhaust gas flow.

A sensor tube structure according to an exemplary form of the present disclosure may include a sensor housing, a sensor mounted on the sensor housing, an external tube mounted at an end of the sensor housing to enclose the sensor, an inner tube provided to be movable inside the external tube, a drive plate coupled to the inner tube and provided with a sensor hole into which the sensor, and an actuator mounted on the sensor housing and configured to selectively move the drive plate.

The sensor tube structure may further include an elastic portion provided between the drive plate and the actuator.

In one form, an external tube protrusion may formed internally in the external tube, and an inner tube protrusion may be formed externally in the inner tube, so that the inner tube is not separated.

A tube hole through which exhaust gas inflows may be formed in the inner tube.

An end of the inner tube is a shape that may be bent inward, and an end of the external tube may be a shape that is bent inward.

The end of the inner tube may be more protrude than the end of the external tube.

A guide hole into which the inner tube is selectively inserted may be formed to the sensor housing.

A guide protrude portion may be formed in the inner tube to guide the movement of the inner tube.

In one form, the actuator may include a solenoid.

In another form, the sensor tube structure may further include: an operation state measuring portion that measures operation states of a vehicle and outputs corresponding signals, and a controller that controls an operation of the actuator based on the output signals of the operation state measuring portion. In particular, the controller may operate the actuator when an exhaust flow model value based on a current vehicle operation is greater than a predetermined reference exhaust flow model value based on the output signal of the operation state measuring portion.

The controller may operate the actuator when a response time of the sensor exceeds a predetermined reference response time.

A sensor tube structure according to an exemplary form of the present disclosure may include: a sensor mounted on an end of a sensor housing, an external tube mounted at an end of the sensor housing to enclose the sensor, and an inner tube provided between the external tube and the sensor to be oscillated or vibrated according to exhaust gas flow.

The sensor tube structure may further include an elastic portion elastically supporting the inner tube.

In one form, an external tube protrusion may be formed internally in the external tube, and an inner tube protrusion may be formed externally in the inner tube so that the inner tube is not separated.

A tube hole through which exhaust gas inflows may be formed to the inner tube.

An end of the inner tube may be a shape that is bent inward, and an end of the external tube may be a shape that is bent inward.

The end of the inner tube may be more protrude than the end of the external tube.

The sensor may be an oxygen sensor.

According to the sensor tube structure of an exemplary form of the present disclosure, even if carbon is deposited on the sensor, the deposited carbon can be removed.

According to the sensor tube structure of an exemplary form of the present disclosure, it is possible to reduce the cost of replacing oxygen sensor parts due to carbon deposition.

According to the sensor tube structure of an exemplary form of the present disclosure, the oxygen sensor state can be maintained so that the optimum combust efficiency can be maintained by continuously removing carbon deposited on the oxygen sensor.

According to the sensor tube structure of an exemplary form of the present disclosure, since the accumulated carbon can be removed, the limit set to reduce the amount of carbon generated during mapping of the internal combustion engine can be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure Throughout the specification, parts indicated with the same reference number mean the same constituent elements.

In the drawings, the thickness of layers, films, panels, regions, etc., are exaggerated for clarity.

When a part of a layer, film, region, plate, etc. is said to be "above" another part, this includes not only directly above the other part but also another part in the middle.

In contrast, when an element is referred to as being "directly on" another element, there are no intervening elements present.

Throughout the specification and the claims, unless explicitly described to the contrary, the word "comprise" and variations such as "comprises" or "comprising", will be understood to imply the inclusion of stated elements but not the exclusion of any other elements.

An exemplary form of the present disclosure will hereinafter be described in detail with reference to the accompanying drawings.

Figure 1:
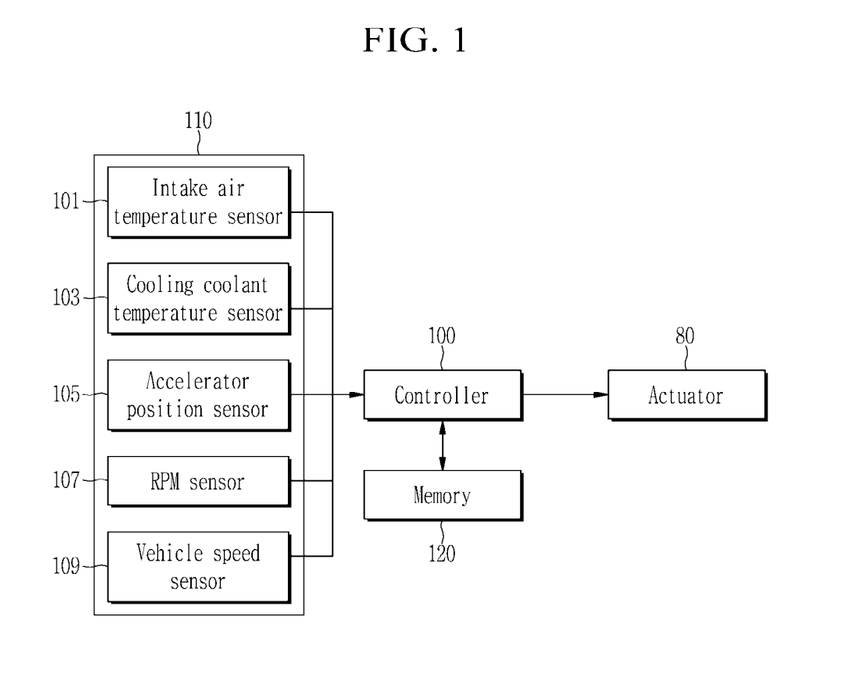
FIG. 1 is a block diagram of a sensor tube structure according to an exemplary form of the present disclosure.

FIG. 1 is a block diagram of a sensor tube structure according to an exemplary form of the present disclosure.

Referring to FIG. 1, a sensor tube structure according to an exemplary form of the present disclosure may include: an operation state measuring portion 110 that measures the vehicle's operation state and outputs the corresponding signal, and a controller 100 that controls the operation of an actuator 80 according to the output signal of the operation state measuring portion 110. The controller 100 can communicate with the memory 120.

For example, the operation state measuring portion 110 may include: an intake air temperature sensor 101 that measures an intake temperature and outputs a corresponding signal, a cooling coolant temperature sensor 103 that measures a coolant temperature and outputs a corresponding signal, an accelerator position sensor 105 that measures an operation angle of an accelerator pedal and outputs a corresponding signal, an RPM (revolutions per minute) sensor 107 that measures an RPM of the engine and outputs a corresponding signal, and a vehicle speed sensor 109 that measures a vehicle speed and outputs a corresponding signal.

The operation state measuring portion 110 may further include various sensors not shown in the drawing that measure operation states of various vehicles and output corresponding signals.

The controller 100 may be a hardware including at least one microprocessor (e.g., ECU (Engine Control Unit or Electronic Control Unit)) or the microprocessor operated by a predetermined program, and the predetermined program may include a series of commands for performing controls of the operation of the sensor tube structure. The program may contain a series of instructions for performing the operation of the sensor tube structure and may be stored in the memory 120.

Figure 2:
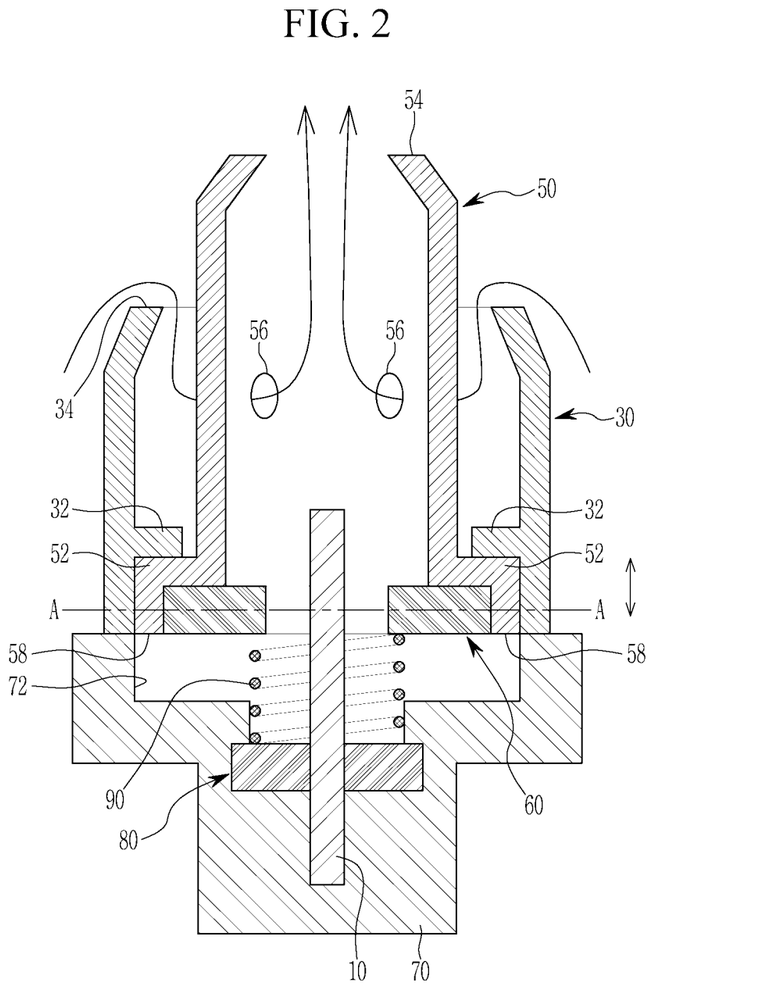
FIG. 2 is a cross-sectional view of the sensor tube structure according to an exemplary form of the present disclosure.
Figure 3:
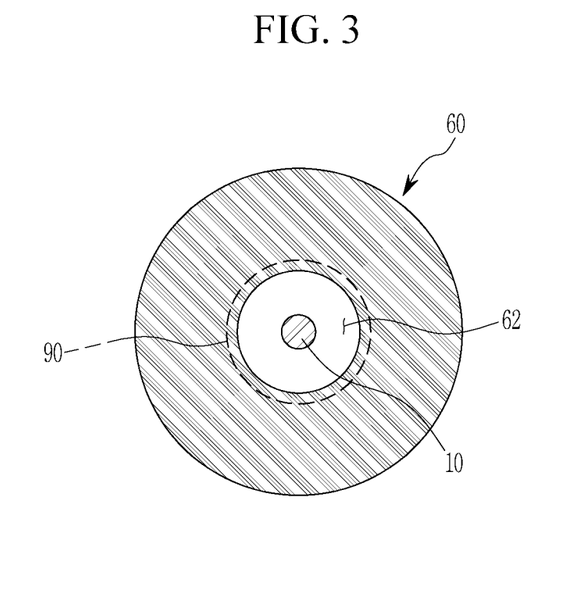
FIG. 3 is a cross-sectional view along line A-A in FIG. 2.

FIG. 2 is a cross-sectional view of the sensor tube structure according to an exemplary form of the present disclosure and FIG. 3 is a cross-sectional view along line A-A in FIG. 2.

Referring to FIG. 2 and FIG. 3, the sensor tube structure may include: a sensor housing 70, a sensor 10 mounted on the sensor housing 70, an external tube 30 mounted at an end of the sensor housing 70 to enclose the sensor 10, an inner tube 50 provided to be movable inside the external tube 30, a drive plate 60 coupled to the inner tube 50, and an actuator 80 mounted on the sensor housing 70 and selectively moving the drive plate 60.

Referring to FIG. 3, a sensor hole 62 into which the sensor 10 is inserted is formed to the drive plate 60, and the drive plate 60 can be moved in the up and down directions of the drawing.

Referring to FIG. 2, an elastic portion 90 is provided between the drive plate 60 and the actuator 80 to elastically support the drive plate 60.

In the external tube 30, an external tube protrusion 32 is formed internally, and in the inner tube 50, an inner tube protrusion 52 is formed externally so that the inner tube 50 is not separated.

A tube hole 56 through which exhaust gas inflows is formed to the inner tube 50.

An end 54 of the inner tube 50 is a shape that is bent inward and an end 34 of the external tube 30 is a shape that is bent inward too.

The end 54 of the inner tube 50 is more protrude than the end 34 of the external tube 30.

The sensor 10 may be an oxygen sensor 10.

In the sensor housing 70, a guide hole 72 into which the inner tube 50 is selectively inserted is formed, and a guide protrude portion 58 is formed in the inner tube 50 to guide the movement of the inner tube 50.

The actuator 80 may contain a solenoid.

Figure 4:
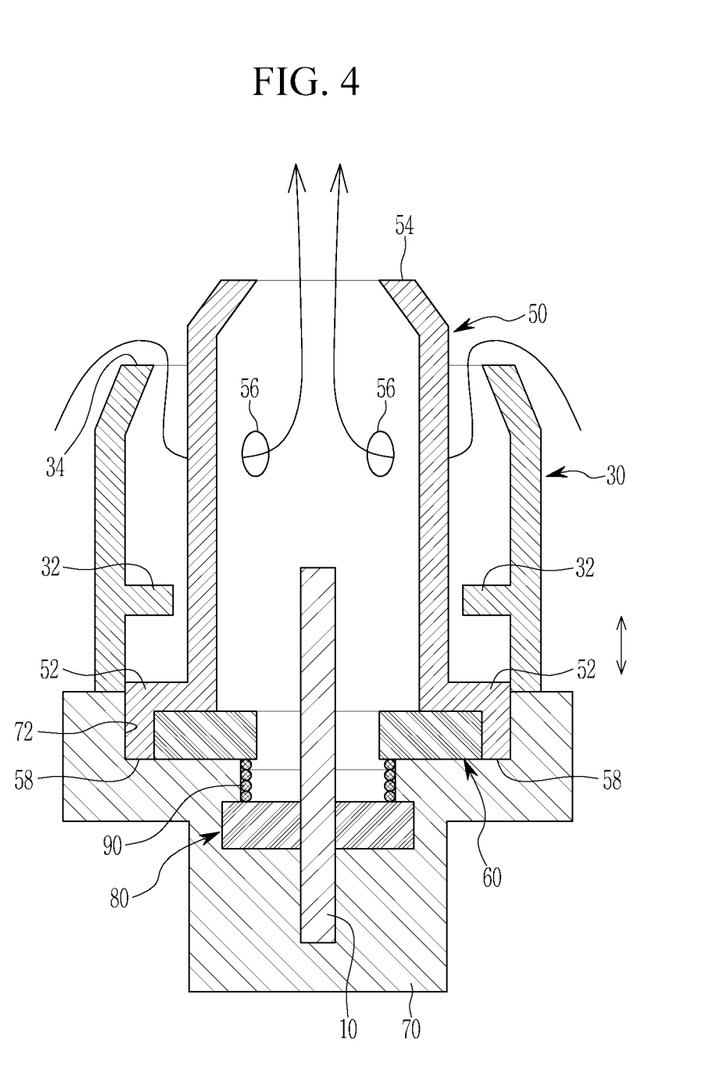
FIG. 4 is a cross-sectional view illustrating the operation of the sensor tube structure according to an exemplary form of the present disclosure.

FIG. 4 is a cross-sectional view illustrating the operation of the sensor tube structure according to an exemplary form of the present disclosure.

Referring to FIG. 1 to FIG. 4, an operation of the sensor tube structure according to an exemplary form of the present disclosure will be described.

In general, oxygen sensors measure oxygen concentration using a zirconia or titania element, and oxygen concentration is measured through the element as some of the exhaust gas passes through the tube structure.

That is, along the arrow direction as shown in FIG. 2, part of the exhaust gas passes between one end 34 of the external tube 30 and the inner tube 50, and inflows into the inner tube 50 through the tube hole 56. Then, the sensor 10 detects the inflowed exhaust gas, and the exhaust gas is exhausted to the outside.

During this process, carbon in the exhaust gas may accumulate inside the tube, that is, the inner tube 50.

Particularly, in the condition of low exhaust flow rate, mainly carbon is deposited as it sticks to the inside of the sensor tube, that is, the inner tube 50.

The controller 100 obtains the current exhaust flow model value of the engine according to the output signal of the operation state measuring portion 110, and determines whether the determined exhaust flow rate model value is greater than a predetermined carbon removal operation value. The exhaust flow model value means the model value of the accumulated exhaust gas flow rate.

The exhaust flow rate model value can be obtained by substituting in a predetermined calculation formula in advance according to the output signal of the operation state measuring portion 110, or can be obtained by substituting in a predetermined map in advance. Determination of the exhaust flow rate model value is a matter that is obvious to those of ordinary skill in the art, and a detailed description is omitted.

The carbon removal operation value is a value determined through an experiment to determine whether carbon deposition occurs inside the inner tube 50, and can be stored in the memory 120.

The controller 100 operates the actuator 80 when the exhaust flow model value according to the current engine operation is greater than the predetermined reference exhaust flow rate model value. That is, when it is determined that carbon removal is need according to the accumulated exhaust gas amount, and then the carbon removal operation is performed.

The controller 100 can operate the actuator 80 when the response time of the sensor 10 exceeds a predetermined reference response time. For example, if the predetermined reference response time is 0.5 sec and the response time of the sensor 10 is 1.0 sec, it is determined that the reaction time is delayed due to carbon deposition, and the controller 100 operates the actuator 80.

For example, the actuator 80 can be a solenoid, and the drive plate 60 can be moved up and down by applying a repetitive current to the solenoid. For example, the drive plate 60 may include a metal material or a permanent magnet, and may be moved inside the guide hole 72 by the operation of the solenoid, and may be repositioned by the elastic force of the elastic portion 90.

The inner tube 50 connected with the drive plate 60 also moves up and down repeatedly, and the carbon deposited on the sensor 10 and the inner tube 50 can be removed.

Here, the inner tube protrusion 52 and the external tube protrusion 32 can move relatively separated by a predetermined distance, and separation of the inner tube 50 can be prevented.

In addition, the guide protrude portion 58 may guide the movement of the inner tube 50.

Figure 5:
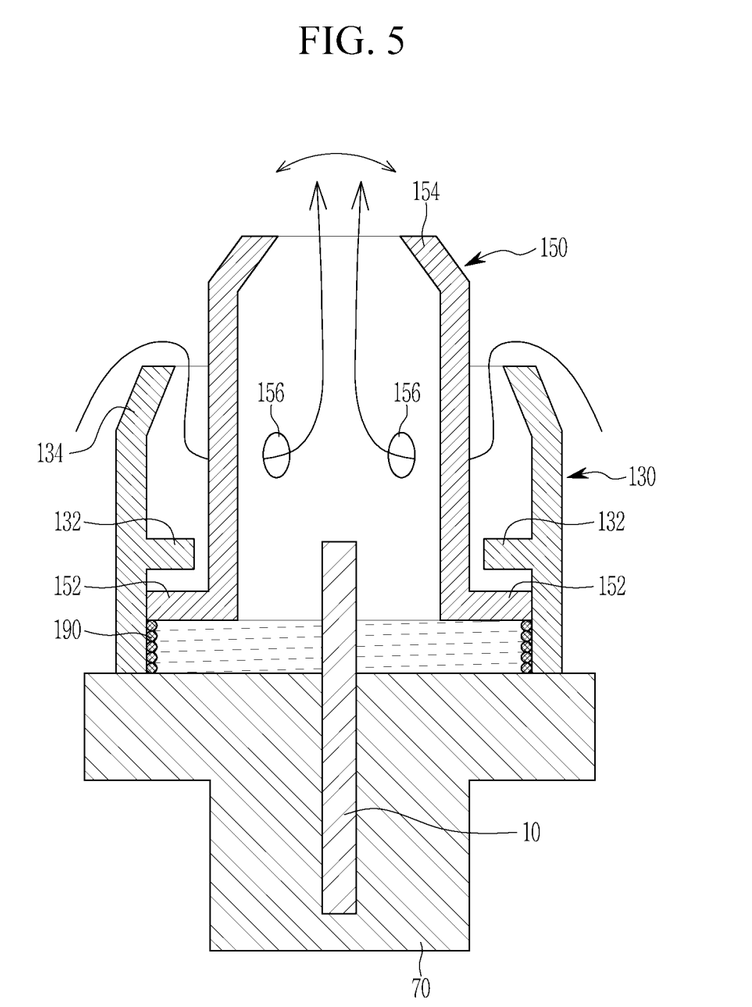
FIG. 5 is a cross-sectional view of a sensor tube structure according to a modified exemplary form of the present disclosure.

FIG. 5 is a cross-sectional view of a sensor tube structure according to a modified exemplary form of the present disclosure.

In describing the sensor tube structure according to a modified exemplary form of the present disclosure shown in FIG. 5, for the convenience of understanding, the same reference numerals for the same elements described in the sensor tube structure according to an exemplary form of the present disclosure shown in FIG. 1 to FIG. 4 are used, and repeated descriptions are omitted.

Referring to FIG. 5, the sensor tube structure according to a modified exemplary form of the present disclosure may include a sensor 10 mounted on an end of a sensor housing 70, an external tube 130 mounted at an end of the sensor housing 70 to enclose the sensor 10, and an inner tube 150 provided between the external tube 130 and the sensor 10 to be oscillated or vibrated according to exhaust gas flow.

The sensor tube structure according to another exemplary form of the present disclosure may further include an elastic portion 190 that elastically supports the external tube 130.

In the external tube 130, an external tube protrusion 132 is formed internally, and in the inner tube 150, an inner tube protrusion 152 is formed externally so that the inner tube 150 is not separated.

A tube hole 156 through which exhaust gas inflows is formed to the inner tube 150.

An end 154 of the inner tube 150 is a shape that is bent inward and an end 134 of the external tube 130 is a shape that is bent inward too.

The end 154 of the inner tube 150 is more protrude than the end 134 of the external tube 130.

The sensor 10 may be an oxygen sensor 10.

Hereinafter, referring to FIG. 5, an operation of the sensor tube structure according to a modified exemplary form of the present disclosure will be described.

Along the arrow direction as shown in FIG. 5, part of the exhaust gas passes between one end 134 of the external tube 130 and the inner tube 150, and inflows into the inner tube 150 through the tube hole 156. Then, the sensor 10 detects the inflowed exhaust gas, and the exhaust gas is exhausted to the outside.

During this process, carbon in the exhaust gas may accumulate inside the tube, that is, the inner tube 150.

Particularly, in the condition of low exhaust flow rate, mainly carbon is deposited as it sticks to the inside of the sensor tube, that is, the inner tube 150.

However, in the sensor tube structure according to the modified exemplary form of the present disclosure, the inner tube 150 is not fixed, but is provided so as to oscillate or vibrate according to the exhaust gas flow. In the case that the inner tube 150 is mounted on the elastic portion 190 and the exhaust gas flow is relatively increased, the inner tube 150 may be shaken under high rpm conditions.

That is, the inner tube 150 may be shaken in the arrow direction in FIG. 5, and the carbon deposited in the inner tube 150 can be separated and exhausted outside the oxygen sensor 10 according to the movement of the inner tube 150.

Here, the inner tube protrusion 152 and the external tube protrusion 132 are separated by a predetermined distance and can move relatively to each other, while separation of the inner tube 150 is prevented.

The sensor tube structure shown in FIG. 5 may remove the deposited carbon with a simplified configuration compared with the sensor tube structure according to an exemplary form of the present disclosure shown in FIGS. 1 to 4.

That is, the sensor tube structure according to a modified exemplary form of the present disclosure shown in FIG. 5 may be a simple configuration without a drive plate or actuator, and it is possible to remove the accumulated carbon without a process such as exhaust gas measurement.

Figure 6:
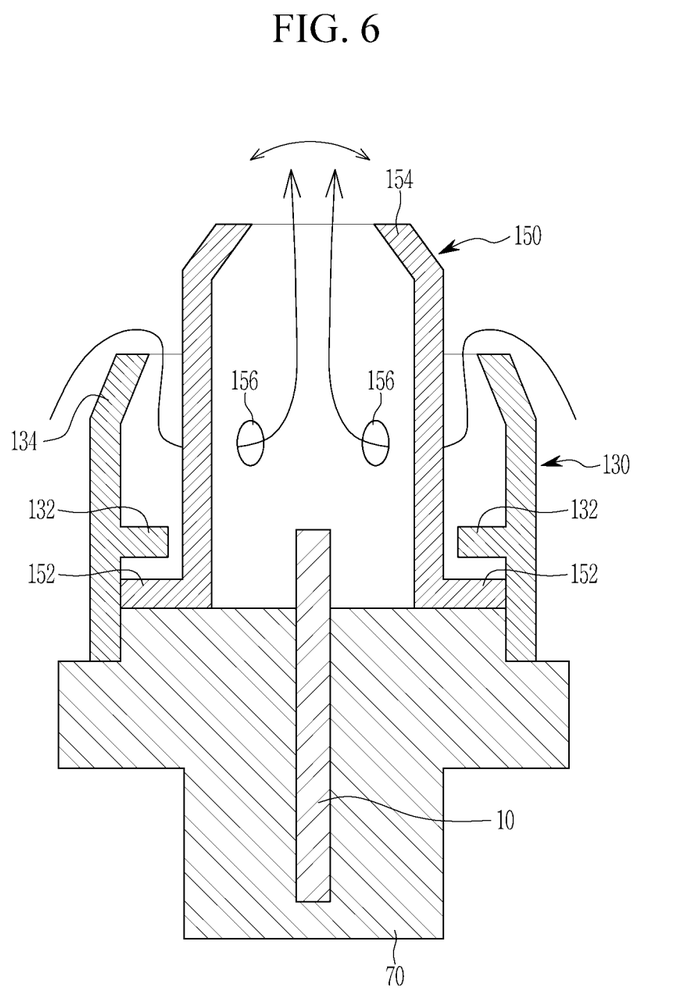
FIG. 6 is a cross-sectional view of the sensor tube structure according to another modified exemplary form of the present disclosure.

FIG. 6 is a cross-sectional view of the sensor tube structure according to another modified exemplary form of the present disclosure.

The sensor tube structure according to another modified exemplary form of the present disclosure in FIG. 6 is a configuration in which the elastic portion 190 is omitted compared to the sensor tube structure described in FIG. 5.

That is, sensor tube structure according to another modified exemplary form of the present disclosure may include a sensor 10 mounted on an end of a sensor housing 70, an external tube 130 mounted at an end of the sensor housing 70 to enclose the sensor 10, and an inner tube 150 provided between the external tube 130 and the sensor 10 to be oscillated or vibrated according to exhaust gas flow.

With respect to the external tube 130, the inner tube 150 can move relative to remove the carbon deposited.

Along the arrow direction as shown in FIG. 6, the inner tube 150 may be shaken, and the accumulated carbon may be separated by the movement of the inner tube 150 and exhausted to the outside of the oxygen sensor.

As described above, according to the sensor tube structure according to exemplary forms of the present disclosure, it is possible to remove carbon deposited on the sensor.

According to the sensor tube structure according to exemplary forms of the present disclosure, it is possible to reduce the cost of replacing oxygen sensor parts due to carbon deposition.

According to the sensor tube structure of exemplary forms of the present disclosure, the oxygen sensor state can be maintained so that the optimum combust efficiency can be maintained by continuously removing carbon deposited on the oxygen sensor.

According to the sensor tube structure of exemplary forms of the present disclosure, since the accumulated carbon can be removed, the limit set to reduce the amount of carbon generated during mapping of the internal combustion engine can be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 10: sensor | 30, 130: external tube |
| 32, 132: external tube protrusion | 34, 134: external tube end |
| 50, 150: inner tube | 52, 152: inner tube protrusion |
| 54, 154: inner tube end | 56, 156: tube hole |
| 58: guide protrude portion | 60: drive plate |
| 62: sensor hole | 70: sensor housing |

<Description of symbols>

| | |
|---|---|
| 72: guide hole | 80: actuator |
| 90, 190: elastic portion | 100: controller |
| 101: intake air temperature sensor | |
| 103: cooling coolant temperature sensor | |
| 105: accelerator position sensor | 107: RPM sensor |
| 109: vehicle speed sensor | |
| 110: operation state measuring portion | |
| 120: memory | |

What is claimed is:

1. A sensor tube structure comprising:
    a sensor housing;
    a sensor mounted on the sensor housing;
    an external tube mounted at an end of the sensor housing to enclose the sensor;
    an inner tube provided to be movable inside the external tube;
    a drive plate coupled to the inner tube and provided with a sensor hole into which the sensor is inserted; and
    an actuator mounted on the sensor housing and configured to selectively move the drive plate.

2. The sensor tube structure of claim 1, further comprising an elastic portion provided between the drive plate and the actuator.

3. The sensor tube structure of claim 1, wherein:
    an external tube protrusion is formed internally in the external tube; and
    an inner tube protrusion is formed externally in the inner tube so that the inner tube is not separated from the external tube.

4. The sensor tube structure of claim 1, wherein a tube hole through which exhaust gas inflows is formed in the inner tube.

5. The sensor tube structure of claim 1, wherein the actuator comprises a solenoid.

6. The sensor tube structure of claim 1, wherein:
    an end of the inner tube is a shape that is bent inward; and
    an end of the external tube is a shape that is bent inward.

7. The sensor tube structure of claim 6, wherein the end of the inner tube protrudes outward than the end of the external tube.

8. The sensor tube structure of claim 1, wherein a guide hole into which the inner tube is selectively inserted is formed in the sensor housing.

9. The sensor tube structure of claim 8, wherein a guide protrude portion is formed in the inner tube and configured to guide a movement of the inner tube.

10. The sensor tube structure of claim 1, further comprising:
    an operation state measuring portion configured to measure operation states of a vehicle and output corresponding signals; and
    a controller configured to control an operation of the actuator based on the output signals of the operation state measuring portion,
    wherein the controller is configured to operate the actuator when an exhaust flow model value based on a current vehicle operation is greater than a predetermined reference exhaust flow model value based on the output signals of the operation state measuring portion.

11. The sensor tube structure of claim 10, wherein the controller is configured to operate the actuator when a response time of the sensor exceeds a predetermined reference response time.

12. A sensor tube structure comprising:
a sensor mounted on an end of a sensor housing;
an external tube mounted at an end of the sensor housing to enclose the sensor; and
an inner tube provided between the external tube and the sensor and configured to be oscillated or vibrated according to an exhaust gas flow,
wherein:
an end of the inner tube is a shape that is bent inward; and
an end of the external tube is a shape that is bent inward.

13. The sensor tube structure of claim 12, further comprising an elastic portion configured to elastically support the inner tube.

14. The sensor tube structure of claim 12, wherein:
an external tube protrusion is formed internally in the external tube; and
an inner tube protrusion is formed externally in the inner tube so that the inner tube is not separated from the external tube.

15. The sensor tube structure of claim 12, wherein a tube hole through which exhaust gas inflows is formed in the inner tube.

16. The sensor tube structure of claim 12, wherein the end of the inner tube protrudes outward than the end of the external tube.

17. The sensor tube structure of claim 12, wherein the sensor is an oxygen sensor.

* * * * *